INVENTOR
CARL F. BACHLE
BY Sauke, Krass, & Gifford
ATTORNEYS

United States Patent Office 3,450,113
Patented June 17, 1969

3,450,113
VALVE CONSTRUCTION FOR VARIABLE COMPRESSION RATIO PISTON
Carl F. Bachle, Grosse Pointe, Mich., assignor to Continental Aviation and Engineering Corporation, Detroit, Mich., a corporation of Virginia
Filed Dec. 8, 1967, Ser. No. 689,201
Int. Cl. F02b 75/04
U.S. Cl. 123—78                                 9 Claims

ABSTRACT OF THE DISCLOSURE

A two-part variable compression ratio (VCR) piston provided with an upper and lower variable volume chamber adapted to contain an incompressible fluid such as oil from the lubrication system of the engine and being interconnected to automatically regulate the compression ratio of the engine to maintain a predetermined maximum combustion chamber pressure by moving one of the parts relative to the other. The pressure regulating discharge valve for the upper chamber includes means for increasing the working surface of the valve upon initial opening thereof and includes a spring tension adjusting member accessible from the underside of the piston for adjusting the spring tension on the valve to thereby vary the combustion chamber pressure at which the valve will open.

BACKGROUND OF THE INVENTION

The present invention relates to an internal combustion engine particularly to such engines employing means for varying the compression ratio thereof and more particularly to an improved means for controlling relative movement of two-part pistons such as those disclosed in U.S. Patents Nos. 3,156,162, 3,161,112, 3,185,137, 3,185,138, 3,303,831, 3,311,096, all assigned to the assignee of the present application.

In each of the aforesaid patents, a two-part variable compression ratio piston is disclosed in which an inner member or piston pin carrier is connected in the usual manner to a connecting rod and carries an outer member or shell which is movable axially relative to the inner member. Clearance spaces are provided between the top and bottom ends of the inner and outer members and these form upper and lower chambers which vary conversely in volume in relation to the relative movement of the members. The chambers are adapted to contain an incompressible fluid such as oil. By controlling the flow of oil to and from these chambers, the movement of the outer member relative to the inner member in response to piston reciprocation and combustion chamber pressure is controlled for varying the clearance volume of the cylinder in which the piston reciprocates to thereby vary the compression ratio of the engine.

In addition, Patent No. 3,303,831 discloses such a construction which includes a pressure regulating valve arranged such that its direction of movement is parallel to the travel of the piston and on opening, it is moved in a direction toward the upper chamber. By arranging and constructing the valve in this manner, the effects of inertia on the operation of the valve as produced by increased engine speeds are nullified and such increased inertia is used as an aid in opening the valve.

Further in this particular patent a construction for the pressure regulating valve is disclosed in which a small working surface is exposed to the oil to produce inertial opening of the valve. Once the valve is unseated, a larger working surface is exposed to the pressure so that the valve will open quickly.

SUMMARY OF THE INVENTION

The present invention provides a pressure regulating valve construction including the advantages of the construction disclosed in Patent No. 3,303,831. In addition, the construction of the present invention includes means accessible from the underside of the piston for adjusting the spring tension opposing valve opening so that the valve member can be readily adjusted to regulate the combustion chamber pressure at which it will open. Heretofore such an adjustment was not possible and if it were found that the valve member opened at the wrong combustion chamber pressure it was necessary to remove and replace the valve with a new unit. This was a difficult operation and required disassembly of a substantial portion of the engine.

BRIEF DESCRIPTION OF THE DRAWINGS

A preferred embodiment of the present invention is more fully described in the following description which makes reference to the accompanying drawings illustrating a preferred embodiment of the invention and in which like reference characters refer to like parts throughout the several views and in which.

DESCRIPTION OF A PREFERRED EMBODIMENT

Figure 1:
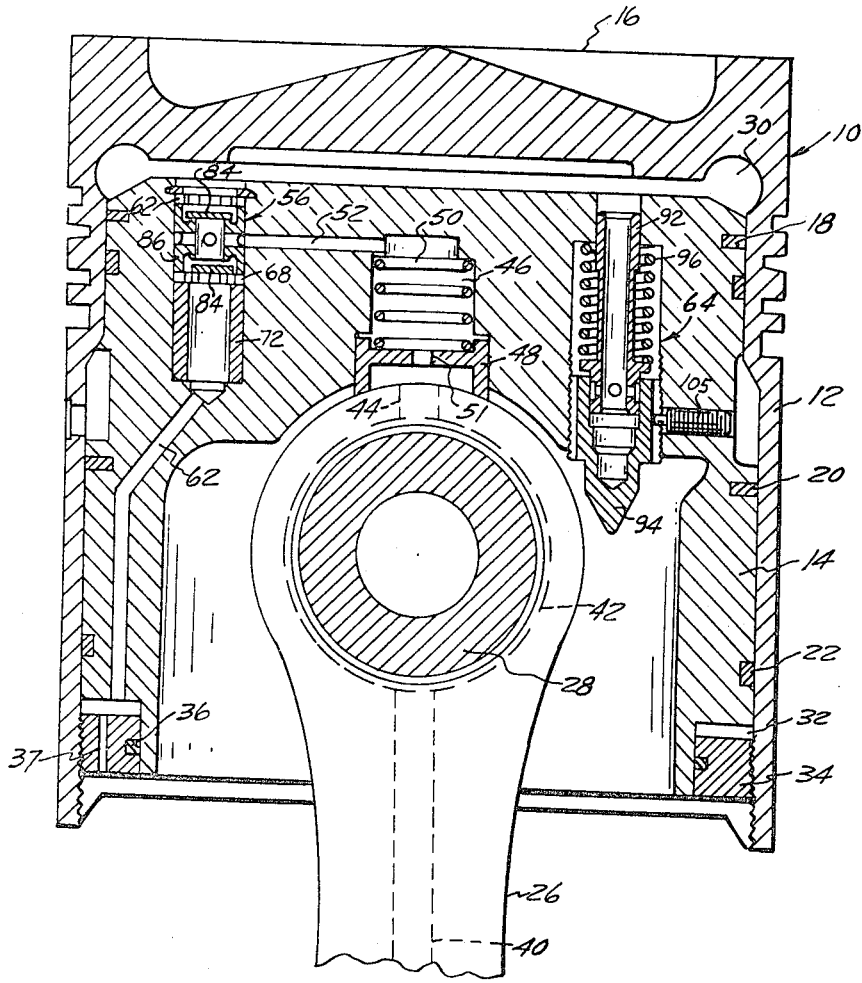
FIG. 1 is a vertical section through the axis of an improved VCR piston constructed in accordance with the present invention.
Figure 2:
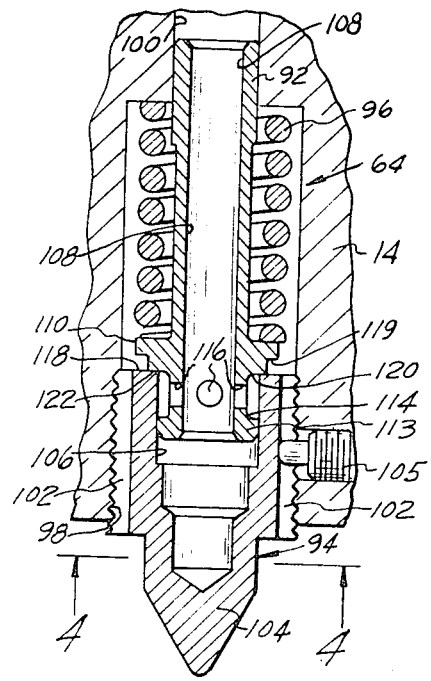
FIG. 2 is an enlarged sectional view of the pressure regulating discharge valve of the invention as shown in FIG. 1.

Now referring to the drawings for a more detailed description of the present invention, a preferred variable compression ratio (VCR) piston 10 is illustrated and is adapted for reciprocation in the bore of a cylinder of an internal combustion engine. The piston 10 consists of two parts, an outer member or shell 12 which is carried on an inner member or piston pin carrier 14. The outer member 12 has a crown 16 which serves as the head of the piston 10 and which forms a movable wall of the lower boundary of a combustion chamber. The inner member 14 is axially slidable within and with respect to the outer member 12 and is provided with rings 18, 20 and 22, which sealingly engage the inner surface of the outer member 12. Inner member 14 is linked to the crankshaft of the engine by connecting rod 26 and a wrist pin 28 in the conventional manner. Thus, the inner member 14 is movable axially between fixed upper and lower limits in the manner of a conventional piston while the outer member 12 can move axially upwardly and downwardly relative to the inner member 14 within limits which will be presently described.

An upper variable volume chamber 30 is formed intermediate the upper surface of the member 14 and the lower surface of the crown 16. A lower variable volume chamber 32 is formed intermediate a lower surface formed by an annular recess at the lower end of the inner member 14 and the upper surface of a ring 34 fixed to the outer member 12. A sealing ring 36 is carried by the ring 34 adjacent surfaces of the member 14 and ring 34. Restricted orifice 37 formed in the ring 34 connects the lower chamber 32 with the crankcase of the engine.

The ring 34 and the lower surface of the crown 16 defining the chamber 30 provide the limits of axial movement of the outer member 12 relative to the inner member 14. This relative movement provides a variable height from the center of the wrist pin 28 to the top of the piston crown 16 to thereby vary the compression ratio of the engine.

The movement of outer member 12 upwardly (FIG. 1) relative to inner member 14 expands upper chamber 30 while contraction of these members expands lower chamber 32. This movement of the outer member 12 relative to the inner member 14 then can be automatically controlled by regulation of the flow of an incompressible fluid into and out of the chambers 30 and 32. In the present invention the control fluid preferably comprises oil supplied to the piston 10 from the usual pressurized lubricating supply of the engine by an oil passage 40 formed in the connecting rod 26.

Passage 40 preferably connects with an annular groove 42 encircling the pin 28 and leading to an outlet 44 connected by way of a collector assembly 47 to a passage 52 formed in the inner member 14. The slipper collector assembly 47 is similar to that disclosed in the aforementioned patents and preferably comprises a collector cap 48 carried in a cavity 46 formed in the inner member 14 and urged by a spring 50 into sealing engagement with the upper surface of the connecting rod 26 so that oil is directed from the outlet 44 to the interior of the cap 48 in all positons of the connecting rod 26 with respect to the axis of the pin 28. An opening 51 is provided in the collector cap 48 which directs the oil to the passage 52. Passage 52 connects with the upper chamber 30 and the lower chamber 32 through a supply valve assembly generally indicated at 56.

Communication between the supply valve assembly 56 and the upper chamber 30 is afforded through a passage 60 and communication between the supply valve assembly 56 and the lower chamber 32 is afforded through a passage 62.

A pressure regulating discharge valve assembly generally indicated at 64 connects the upper chamber 30 to crankcase atmosphere as illustrated in FIG. 1.

Figure 5:
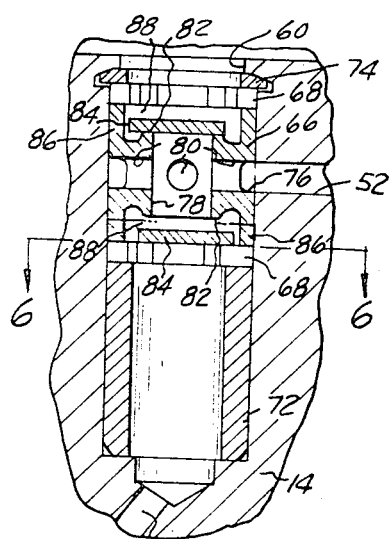
FIG. 5 is an enlarged sectional view of the supply valve shown in FIG. 1.
Figure 6:
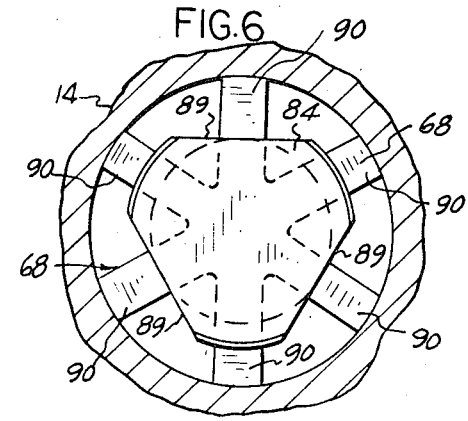
FIG. 6 is a cross-sectional view taken substantially on line 6—6 of FIG. 5.

The supply valve assembly 56, as disclosed in U.S. Patent 3,405,698 and as can best be seen in FIGS. 5 and 6, preferably comprises a seat member 66 with stops 68 disposed at each end, and mounted in position by a spacer cylinder 72 and a retaining ring 74. Seat member 66 is provided with an external annular groove 76 which registers with the passage 52 and communicates with an interior through passage 78 by way of a series of annularly spaced ports 80. Valve seats 82 are formed at each end of the through passage 78 and are adapted to be engaged by valve plates 84. The ends of the seat member 66 are formed with extended cylindrical portions 86 which engage the stops 68 so that a chamber 88 is formed in each end of the seat member 66 intermediate the seats 82 and the stops 68 to provide an area permitting the valve plates 84 to move between a position enclosing the through passage 78 and a position engaging the stops 68 and thus opening flow from the passage 78 to the chamber 88.

As best seen in FIG. 6, the valve plates 84 are provided with chordially removed portions 89 as a precaution against the valve plates 84 becoming wedged against the inner surface of the extended portions 86 at some intermediate position. Also the stops 68 are of a larger diameter than the valve plates 84 and are formed to provide radially extending tangs 90 so that the oil can pass through the spaces between the tangs 90 when the valve plate 84 is in a position against the stop 68.

The discharge valve assembly 64 as can best be seen in FIGS. 1–4 preferably comprises a tubular valve member 92, a guide member 94, and a spring 96.

Figure 4:
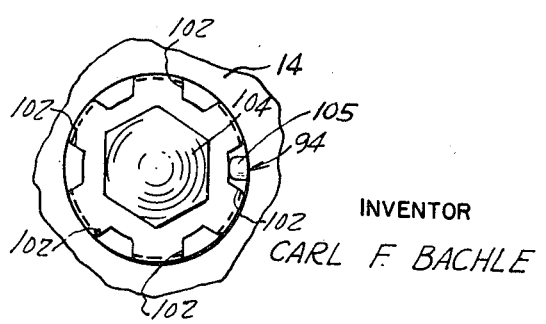
FIG. 4 is a cross-sectional view taken substantially on line 4—4 of FIG. 2.

The guide member 94 is received in a lower threaded portion 98 of a bore 100, the upper end of which registers with the upper chamber 30. The upper exterior portion of the guide member 94 is externally threaded and as can best be seen in FIG. 4 is provided with a plurality of equally spaced, axially extending grooves 102. The lower exterior portion of the guide member 94 is formed in a manner of a bolt head as shown at 104 so that the guide member 94 with a suitable wrench can be mounted in place in the threaded portion 98 of the bore 100. A spring biased plunger assembly 105 is preferably carried in the member 14 in a position to be moved into one of the grooves 102 to thereby lock the guide member 94 in a rotated position. An internal bore 106 formed in the upper end of the guide member 94 axially slidably receives the lower end of the tubular valve member 92.

The valve member 92 is hollow and open ended to form a central passage 108 communicating with the upper chamber 30 and is formed with an intermediate enlarged diameter portion 110 which forms the seat for the lower end of the spring 96 to urge the lower end of the valve member 92 into the bore 106 of the guide member 94 and thus close the lower open end of the passage 108.

The lower end 113 of the valve 92 is dimensioned to closely fit within the bore 106 to insure proper movement of the valve 92. An external annular groove 114 is formed above the lower end 113 and extends to the enlarged portion 110. A plurality of ports 116 provide communication between the central passage 108 and the groove 114. The upper right angled annular surface 118 of valve guide 94 forms a valve seat and the spring 96 urges the valve member 92 toward the position illustrated in FIG. 2 in which the lower of valve surface of the portion 110 engages the valve seat 118 to close oil flow from the groove 114 and between the valve surface of the member 92 and the valve seat 118.

Figure 3:
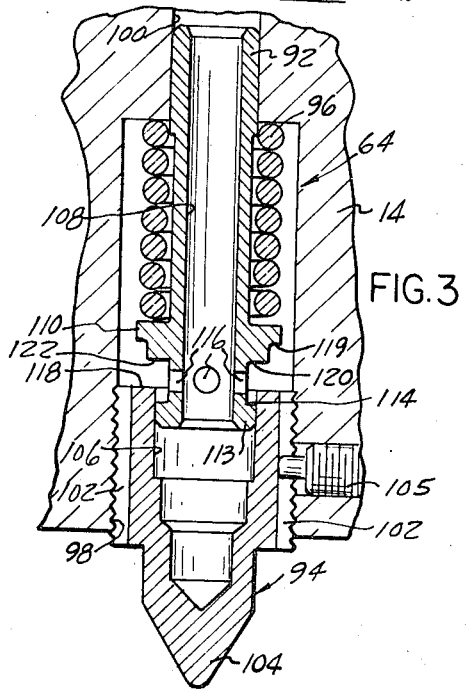
FIG. 3 is a view similar to FIG. 2 but illustrating the valve in an open position.

With the valve member 92 moved to the open position illustrated in FIG. 3 oil flows from chamber 30, through the passage 108, the ports 116 and past the valve seat 118 and the valve surface of portion 110 to flow axially through the grooves 102 of valve member 94 to crankcase atmosphere. To reduce interference to the passage of oil past the open valve member 92 an annular recess 119 is preferably formed in the portion in the portion 110 above the valve surface.

Opening of the valve member 92 is achieved by oil pressure acting upon that portion 120 of the valve surface forming the upper boundary of the groove 114 and which is exposed with the valve 92 closed to oil within the passage 108 and thus the pressure within upper chamber 30. Once the valve member 92 moves to an open position then that portion 122 of the valve surface normally engaging the seat 118 also is exposed to the oil pressure in passage 108.

OPERATION

Assuming that the combustion chamber pressure is below the predetermined maximum value which the VCR piston 10 is designed to maintain and that the upper and lower chambers 30 and 32 are both filled with oil, during the latter part of each upward stroke of the piston 10 at the end of the exhaust stroke and the early part of each downward intake stroke, the momentum of the outer member 12 tends to move it upwardly relative to the inner member 14 thereby tending to expand upper chamber 30 and contract lower chamber 32. The resulting increase in oil pressure in lower chamber 32 will cause the lower valve plate 84 of the supply valve assembly 56 to move upwardly against the lower valve seat 82 to close oil flow from the passage 52 to the lower chamber 32. This will produce an hydraulic lock between the members 12 and 14 by reason of the oil contained within the lower chamber 32 with the result that during each cycle of engine operation upward relative movement of the outer member 12 with respect to the inner member 14 will be slight and only to the degree permitted by the escape of oil from the lower chamber 32 by way of the orifice 37. Similarly the tendency of the upper chamber 30 to expand during this position in the piston operation will cause the upper plate 84 of the supply valve assembly 56 to move to an upper position against the stop 68 to open oil flow from the passage 52 to the upper chamber 30.

The controlled discharge from lower chamber 32 through the restricted orifice 37 then permits a gradual cyclic decrease in the volume of the lower chamber 32 and thus a corresponding increase in the volume of the upper chamber 30 to provide relative upward movement between the outer member 12 and the inner member 14. As the upper chamber 30 increases in volume, oil from the lubrication system is directed through the supply valve assembly 56 into the upper chamber 30 to maintain that chamber in a filled condition.

During the compression and power stroke, the gas pressure acting on piston crown 16 is transmitted to the inner member 14 through the oil in the upper chamber 30 creating a high oil pressure in this chamber. Whenever the gas pressure exceeds the selected upper limit, sufficient oil pressure is built up in the upper chamber 30 to open the discharge valve assembly 64 and release some of the oil allowing the outer member 12 to move downwardly relative to inner member 14 and thus decreasing the compression ratio of the engine. The downward relative movement of the outer member 12 enlarges chamber 32 and the lower valve plate 84 of the supply valve assembly 56 is moved to a position against the lower stop 68 to open the lower chamber 32 to passage 52 and oil then enters the lower chamber 32 to keep it fully charged.

The amount of oil discharged from the upper chamber 30 during any compression stroke depends upon the margin by which the cylinder gas pressure exceeds that necessary to cause the discharge valve assembly 64 to open and the duration of this excess pressure. The valve spring setting and the magnitude of duration of the excess gas pressure determines the downward movement of outer member 12 relative to inner member 14. The upward relative movement, on the other hand, is the same on each exhaust and induction stroke and is determined by the size of the fixed orifice 37. If the upward and downward relative movements are equal as is the case when the engine is running under a constant load, the effective compression ratio will remain unchanged. If the load is increased, the downward movements will exceed the upward movements lowering the compression ratio until an equilibrium has been established. Conversely, if the load is reduced, the compression ratio will increase to a new point of equilibrium.

The above-described operation assumes that the VCR piston is reciprocating at a constant speed. However, it has been found that when a conventional spring loaded pressure regulated valve is used to control pressure in the upper chamber 30 combustion pressure tends to creep above the desired maximum as engine speed increases. This is due in part to the increased effect of inertia at high engine speeds. In the usual valve construction the inertia force opposes opening of the valve and since the inertia force increases with the square of engine speed, at high speeds the valve will not open until the desired maximum combustion pressure has been surpassed. The pressure regulating discharge valve 64 of the present invention is constructed to overcome these problems and to maintain a substantially uniform maximum combustion chamber pressure regardless of engine speed.

Due to the orientation of the tubular valve member 92 so that it moves in a direction parallel to the travel of the piston 10 and due to the valve closing movement being in the downward direction away from the cylinder combustion chamber, the valve closing force exerted by spring 96 is opposite to the inertia forces acting on valve member 92 as the piston 10 decelerates in approaching top dead cecnter and then accelerates in the opposite direction after passing top dead center. This inertial loading on valve member 92 increases in proportion to the square of engine speed and acts as an opening force on valve member 92 which increases with engine speed. Since the inertial force opposes the valve closing force of the spring 96, the force required to open valve member 92 is reduced as engine speed increases. This in turn causes valve member 92 to be opened by the oil under pressure in chamber 30 at a lower perssure at high speed than at low speeds. This enables valve member 92 to discharge the required volume of oil from the chamber 30 for balancing a unit increase in combustion chamber pressure regardless of engine speed.

Also, since inertial forces act parallel to the direction of valve movement, these forces do not affect the frictional engagement of valve member 92 with either the valve guide 94 or the wall of the bore 100. Thus by providing the aforementioned orientation and closing direction of the valve member 92 relative to piston travel and the combustion chamber respectively, the desired maximum combustion chamber pressure will be maintained by the piston 10 at a substantially uniform rate.

The present invention like the previously mentioned Patent No. 3,303,831, also includes the provision of a small working face in the form of the value surface portion 120 for opening the valve thus permitting a weaker spring and less material for the valve member 92, all as described in the aforementioned patent. Further, like the aforementioned patent, the valve member 92 of the present invention is provided with an increased working face by reason of the portion 122 which, upon the valve member 92 being unseated, is exposed to pressure of oil discharged from the passage 108 of the valve member 92 to cause a sudden increase in the valve opening force resulting in a snap opening action which is beneficial in obtaining instantaneous control of oil pressure in the chamber 30.

While in many respects the present invention is quite similar in construction to the last-mentioned patent, it does offer a substantial improvement over the construction illustrated in that patent. This improvement resides in the provision of the valve guide member 94 and the particular manner of mounting it within the lower end of the bore 100 so that the bolt head portion 104 can be received by a suitable wrench for adjustably moving the guide axially within the bore 100. It is apparent that adjusting the position of the valve guide member in the bore 100 also adjusts the position of the valve seat 118 and the valve member 92 in a closed position and thereby varies the preload on the valve assembly 64 produced by the spring 92. In this way then, it is possible to manually adjust the combustion chamber pressure at which the valve assembly 64 will open. This is an important improvement since heretofore such an adjustment could only be accomplished by removing the valve assembly and replacing it with either a new, preset valve assembly or by replacing the spring. The present construction permits adjustment to be made to produce optimum results after the engine has been running. The plunger assembly 105 insures that the valve guide assembly 94 will not be jarred from its adjusted position during engine operation.

From the foregoing description it is now apparent that an improved speed compensated VCR piston and valve structure have been disclosed.

Having thus described my invention, I claim:

1. In an internal combustion engine, a piston having first and second parts movable relative to one another in response to reciprocation of the piston with respect to a combustion chamber of the engine, and having a pressure fluid chamber within said piston which varies in internal volume in response to said relative movement and to variations in the quantity or pressure fluid therein, the combintion therewith of
   (a) means forming a fluid flow passage communicating with said presure fluid chamber,
   (b) a valve member carried by said piston movable to open and close said passage for controlling flow of fluid therethrough to vary the quantity of fluid in said pressure fluid chamber,
   (c) means for yieldably biasing said valve member toward a closed position to regulate the pressure of the fluid in said pressure fluid chamber, (d) means for slidably supporting said valve member and having a valve seat engaged by said valve member to close said passage, said last-mentioned means including a portion accessible from the end of said passage opposite said pressure fluid chamber and selectively movable therefrom within said passage to very the position of said valve seat and to thereby vary the fluid pressure which will actaute said valve member.

2. The combination as defined in claim 2 and in which
(a) said valve member is provided with a first working surface of a predetermined size exposed to fluid pressure in said fluid pressure chamber in both the open and closed positions of said valve member whereby the fluid pressure tends to develop an unseating force on said valve member,
(b) said valve member having a second working surface exposed to fluid pressure in said fluid pressure chamber only when said valve member is unseated, said second working surface augmenting said first working surface and increasing the opening force exerted by the fluid pressure when said valve member is unseated by the fluid pressure in said fluid pressure chamber.

3. The combination as defined in claim 2 and in which
(a) said supporting means comprises a valve guide member forming said valve seat,
(b) said valve member further comprises a first externally enlarged portion forming a radial surface adapted to seat on said valve seat in a manner such that a portion of said radial surface forms said first working surface and is exposed to fluid on the inlet side of said valve member at all times and another portion of said radial surfaces forms said second working surface and seats against said valve seat and is therefore exposed to fluid on the inlet side of said valve member only when said valve member is unseated from said valve seat.

4. The combination as defined in claim 2 and in which
(a) said supporting means comprises a valve guide member seated in said passage,
(b) said valve member is tubular and is adapted to seat against said valve guide member to close fluid flow through the center of said valve member, and
(c) said biasing means comprises a spring urging said valve member against said valve guide member,
(d) said valve seat positioning portion comprises means for moving said vale guide member axially within said passage to thereby move said tubular valve member toward and away from said spring.

5. The combination as defined in claim 1 and in which
(a) said passage connects said pressure fluid chamber with the crankcase of said engine,
(b) said supporting means comprises a valve guide member having an upper recess and being adjustably mounted in the lower end of said passage and including a plurality of axially extending passages connecting said passage with said crankcase,
(c) said valve member being tubular and adapted to be received in said recess of said valve guide member to close communication between the interior of said valve member and the portion of said passage above said valve guide member, and
(d) said biasing means comprising a spring urging said tubular valve member into engagement with said valve guide member.

6. In an internal combustion engine a piston having a first and second part movable relative to one another in response to reciprocation of the piston with respect to a combustion chamber of the engine and having a pressure fluid chamber within said piston which varies in internal volume in response to said relative movement and to variations in the quantity of fluid therein, the combintion therewith of
(a) means forming a fluid flow passage communicating with said pressure fluid chamber,
(b) valve means carried by said piston and movable to open and close said passage for controlling flow fluid therethrough to thereby vary the quantity of fluid in said pressure fluid chamber,
(c) means for yieldably biasing said valve means toward a closed position to thereby regulate the pressure of fluid in said pressure fluid chamber,
(d) said valve means being oriented for movement parallel to the direction of reciprocation of said piston and being adapted to close in a direction opposite to the inertial forces acting on said valve means as said piston decelerates in approaching the combustion chamber,
(e) said valve means including a valve member and a valve guide member for slidably supporting said valve member and having a valve seat engaged by a flange portion of said valve member to close said passage,
(f) said valve member having a first working area on said flange portion of a predetermined size exposed to the fluid pressure on the inlet side of said valve member in both the open and closed position of said valve member whereby the fluid pressure acts upon said first working area to unseat said valve member,
(g) said valve member having a second working area radially outwardly disposed with respect to said first working area and exposed to fluid only when said valve member is unseated and adapted to augment said first working area and increase the opening force exerted by fluid pressure when said valve member is unseated by the fluid pressure, and
(h) said valve seat comprising an annular surface of said valve guide member and said flange portion of said valve member having an outer annular surface defining said second working area and an inner annular surface in the same plane as said outer surface defining said first working area, said valve member seatably contacting the valve guide member along said outer annular surface.

7. The combination as defined in claim 6 and including means for adjusting the position of said valve guide member axially with respect to said pasage to thereby adjust the tension produced by said biasing means and thus the pressure at which said valve member will open.

8. The combination as defined in claim 6 and including means accessible from the underside of said piston for adjusting the pressure at which said valve member will open.

9. The combination as defined in claim 6 and in which said valve guide member is provided with an externally threaded surface adapted to be received by an internally threaded surface forming a portion of said passage, means, for rotating said valve guide member to move it axially along said threaded surface forming said passage whereby to adjust the position of said valve member when it is closed and thus the pressure at which it will open and means for selectively locking said valve guide member in a desired rotated position to thereby lock it against accidental axial movement.

References Cited

UNITED STATES PATENTS

| | | |
|---|---|---|
| 2,573,688 | 11/1951 | Butler. |
| 2,573,689 | 11/1951 | Butler. |
| 2,742,027 | 4/1956 | Mansfield. |
| 2,910,826 | 11/1959 | Mansfield. |
| 3,311,096 | 3/1967 | Bachle et al. |

OTHER REFERENCES

Oil Engine and Gas Turbine, May 1963, p. 36.

WENDELL E. BURNS, *Primary Examiner.*

U.S Cl. X.R.

91—422; 123—48